Patented Oct. 2, 1951

2,569,666

UNITED STATES PATENT OFFICE 2,569,666

ANTIHISTAMINE SALT OF PENICILLIN

Alphonse P. Granatek, Syracuse, N. Y., assignor to Bristol Laboratories Inc., Syracuse, N. Y., a corporation of New York No Drawing. Application October 4, 1950,
Serial No. 188,480

4 Claims. (Cl. 260—239.1)

The present invention relates to a new amine salt of penicillin, more particularly [1-p-chlorophenyl-1-(2-pyridyl)-3,3-dimethylaminopropane penicillin] which is capable of exerting a repository antibiotic actions and is also useful for oral administration and for external application.

The new penicillin salt of the present invention has the following formula

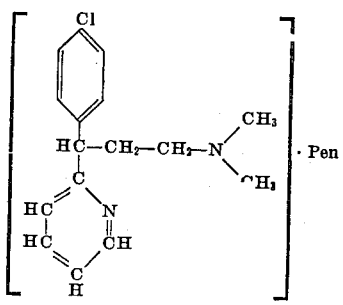

wherein Pen designates an acid penicillin radical or an active moiety thereof, capable of forming an addition salt with [1-p-chlorophenyl-1-(2-pyridyl)-3,3-dimethylaminopropane].

A more comprehensive understanding of this invention is obtained by reference to the following examples.

Example 1

One gram of [1-p-chlorophenyl-1-(2-pyridyl)-3,3-dimethylaminopropane] maleate was suspended in ether and made basic with the addition of sodium hydroxide. A second solution was prepared by adding 1.12 grams of potassium penicillin G to ether and acidifying with phosphoric acid. The two ether solutions were dried with anhydrous sodium sulfate and then added together. After considerable scratching and refrigeration for a period of three days, crystals were formed. The crystalline precipitate was then filtered, resuspended in cold butanol, again filtered and washed with ether. The resulting white precipitate was dried in vacuo and found to have a biological assay of 395 u/mg.

Example 2

Five grams of [1-p-chlorophenyl-1-(2-pyridyl)-3,3-dimethylaminopropane] maleate were suspended in ether and made basic by the addition of sodium hydroxide. A second solution was prepared by dissolving 5.6 grams of potassium penicillin in ether and acidifying by the addition of phosphoric acid. Both solutions were dried over anhydrous sodium sulfate, filtered and then added together. The solution was then scratched with a stirring rod and seeded with crystals obtained from the procedure of Example 1.

Yield—2 grams, crystalline
Potency Biological Assay—1033 u/mg.
Solubility—8000 u/cc.
Theoretical Potency—1020 u/mg.
Theoretical yield—9.1 grams While the present invention has been described with particular reference to the [1-p-chlorophenyl-1-(2-pyridyl)-3,3-dimethylaminopropane] addition salts of penicillin G it will be understood that [1-p-chlorophenyl-1-(2-pyridyl)-3,3-dimethylaminopropane] salts of other penicillins are also included within the scope of this invention. For instance the natural penicillins such as penicillin G, F, X, dihydro F, and K.

Also, other salts of [1-p-chlorophenyl-1-(2-pyridyl)-3,3-dimethylaminopropane], other than the hydrochloride, may be employed. Examples of such salts are phosphate, nitrate, hydrobromide, sulfate, citrate, and tartrate. In general any organic solvent soluble or water soluble salt may be employed.

It will be understood that the reaction can be carried out in organic solvents other than ether. Examples of such solvents are butanol, propanol, amyl acetate, methyl amyl acetate, isopropyl ether, mesityl oxide, methyl isobutyl ketone.

It will be understood that, without departing from the spirit of the invention or the scope of the claims, various modifications may be made in the specific expedients described; the latter are illustrative only, and not offered in a restricting sense, it being desired that only such limitations shall be placed thereon as may be required by the state of the prior art.

I claim:
1. A salt of penicillin and [1-p-chlorophenyl-1-(2-pyridyl)-3,3-dimethylaminopropane].
2. A salt of penicillin G and [1-p-chlorophenyl-1-(2-pyridyl)-3,3-dimethylaminopropane].
3. A salt of penicillin X and [1-p-chlorophenyl-1-(2-pyridyl)-3,3-dimethylaminopropane].
4. A salt of penicillin dihydro F and [1-p-chlorophenyl-1-(2-pyridyl)-3,3-dimethylaminopropane].

ALPHONSE P. GRANATEK.

REFERENCES CITED

The following references are of record in the file of this patent:

UNITED STATES PATENTS

| Number | Name | Date |
|---|---|---|
| 2,493,625 | Goldberg et al. | Jan. 3, 1950 |
| 2,530,488 | Rigley | Nov. 21, 1950 |